United States Patent [19]
Abe et al.

[11] Patent Number: 4,834,826
[45] Date of Patent: May 30, 1989

[54] METHOD OF AN APPARATUS FOR CUTTING HEAT-SHRINKABLE LABELS BY MELTING

[75] Inventors: Takehiro Abe; Yugo Onoyama, both of Shiga, Japan

[73] Assignee: Gunze Kabushiki Kaisha, Ayabe, Japan

[21] Appl. No.: 145,752

[22] PCT Filed: May 11, 1987

[86] PCT No.: PCT/JP87/00291
§ 371 Date: Dec. 21, 1987
§ 102(e) Date: Dec. 21, 1987

[87] PCT Pub. No.: WO87/07246
PCT Pub. Date: Dec. 3, 1987

[30] Foreign Application Priority Data
May 19, 1986 [JP] Japan .................. 61-115861

[51] Int. Cl.⁴ .............................. B32B 31/18
[52] U.S. Cl. ..................... 156/344; 156/250; 156/497; 156/499; 156/529; 156/584
[58] Field of Search ............... 156/82, 251, 344, 497, 156/499, 515, 584, 250, 529

[56] References Cited
U.S. PATENT DOCUMENTS
4,033,804 7/1977 Baldyga .................. 156/344 X
4,599,131 7/1986 Matuszak .................. 156/584
4,715,920 12/1987 Ruppman et al. .......... 156/344

FOREIGN PATENT DOCUMENTS
41092 3/1983 Japan .
125435 9/1983 Japan .
193243 11/1983 Japan .
216533 12/1983 Japan .

Primary Examiner—Robert A. Dawson
Attorney, Agent, or Firm—Sixbey, Friedman, Leedom & Ferguson

[57] ABSTRACT

A method of and an apparatus for cutting labels of heat-shrinkable tube covering bottles in intimate contact with the outer periphery of the bottle by melting the label with hot air applied thereto. The hot air is applied by a jet nozzle comprising a plurality of blocks which are adjustingly movable toward or away the label on the bottle. For use with bottles having a trunk of curved configuration, the blocks are individually adjusted to position each block at a specified distance from the curved bottle surface.

14 Claims, 5 Drawing Sheets

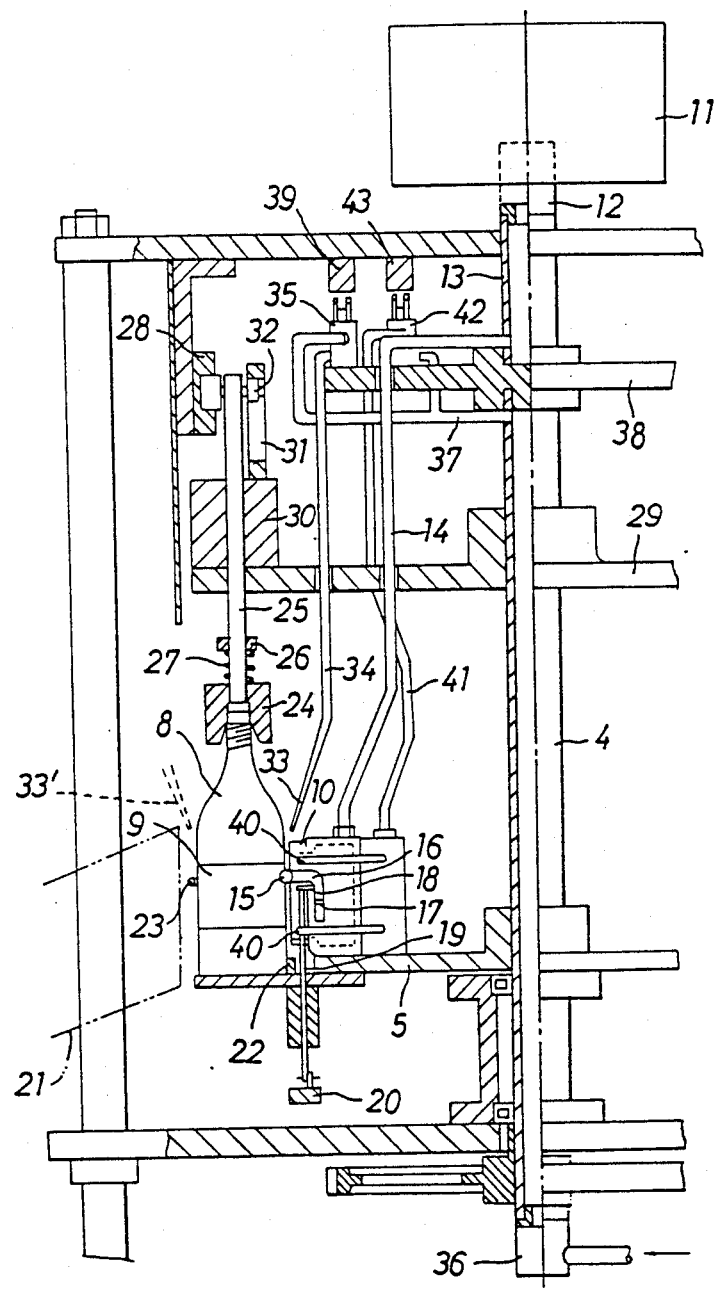
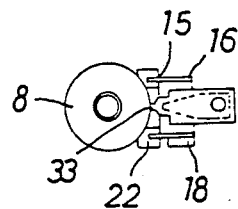

METHOD OF AN APPARATUS FOR CUTTING HEAT-SHRINKABLE LABELS BY MELTING

TECHNICAL FIELD

The present invention relates to a method and an apparatus by which heat-shrinkable tubular labels covering the outer peripheral surfaces of bottles or the like in intimate contact therewith are automatically cut on melting by applying hot air to the label.

BACKGROUND ART

Recently, it is practice to cover the trunks of bottles or the like with a label of heat-shrinkable tube (hereinafter referred to as a "heat-shrinkable label") in intimate contact therewith for labeling and also for protecting the bottle or the like. However, before reusing the bottle collected after use, the label must be removed as by peeling or cutting. It has heretofore been proposed to remove such labels, for example, by applying hot air or a jet of high-pressure water to the label or by irradiating the label with a laser beam. Especially noteworthy among these methods is the method of thermally cutting (melting and cutting) the heat-shrinkable label by forcing a jet of hot air against the side portion of the bottle (see, for example, Unexamined Japanese Patent Publications SHO No. 58-41092, SHO No. 58-125435, SHO No. 58-193243 and SHO No. 58-216533).

Nevertheless, the new bottles recently developed and lightweight bottles made available at a reduced cost include bottles of altered configuration, and for use with such bottles, there arises a need to prepare a novel hot air nozzle other than those heretofore used. When the label is to be removed by melting with hot air, the orifice end of the nozzle must be positioned at a predetermined distance (within a permissible range) from the bottle surface. If otherwise, that is, if the distance is outside the permissible range, the label will not be properly cut smoothly and is likely to remain uncut locally. Accordingly, every time the shape of the bottles to be handled is altered, it becomes necessary to prepare a different nozzle, hence great inconvenience. The conventional nozzle is therefore not usable universally and is costly.

The present invention has been accomplished to solve the above problem of the prior art.

DISCLOSURE OF THE INVENTION

The present invention provides a hot air jet nozzle which comprises a plurality of blocks for applying a jet of hot air to labels and in which each of the blocks is individually movable toward or away from the label to adjust the distance between the surface of the label and the surface of the block opposed to the label.

BRIEF DESCRIPTION OF THE DRAWINGS

The drawings show embodiments of the invention.
FIG. 4 is a side elevation partly in vertical section and showing the same;
FIG. 5 is a plan view of a hot air jet nozzle assembly.

BEST MODE OF CARRYING OUT THE INVENTION

Figure 2:
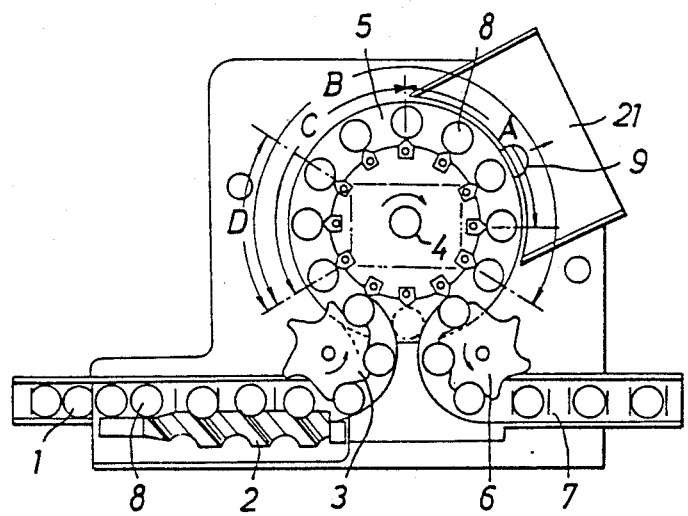
FIG. 2 is an overall plan view schematically showing an apparatus for practicing the method of the invention.
Figure 3:
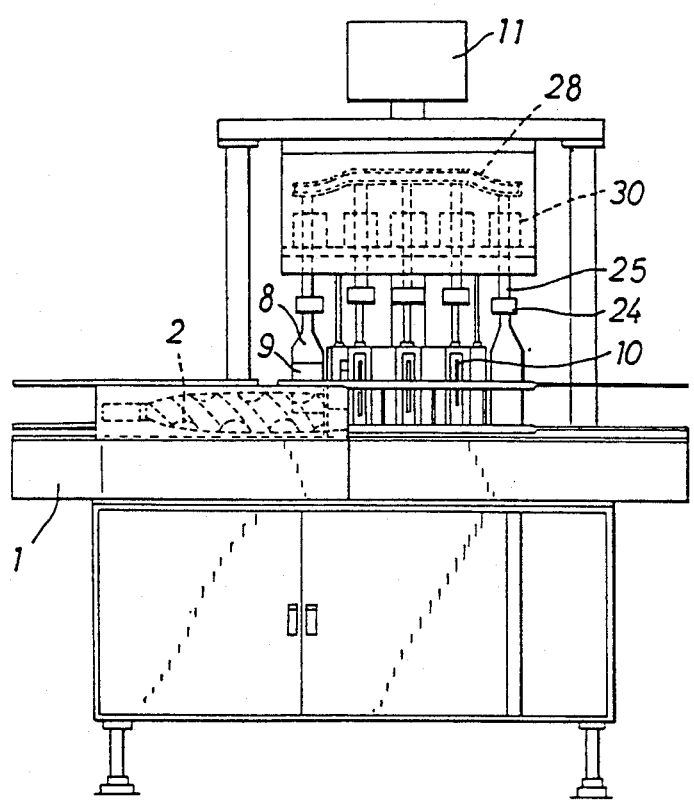
FIG. 3 is a front view of the same.

FIGS. 2 and 3 show an apparatus for automatically removing labels by thermal cutting for use in practicing the method of the invention. The apparatus comprises a feed conveyor 1, a feed screw 2 provided alongside the conveyor 1, a feed star wheel 3 disposed at the forward end of the conveyor 1, a rotary table 5 fixed to a main shaft 4, a discharge star wheel 6, a discharge conveyor 7, etc. A multiplicity of bottles 8 placed on the conveyor 1 are arranged in a row at a specified spacing by the feed screw 2, then transferred onto the rotary table 5 by the feed star wheel 3, transported along a circular path approximately by one turn and thereafter transferred onto the discharge conveyor 7 by the discharge star wheel 6. According to the present embodiment, the conveyors 1 and 7 are connected together endlessly. For the above operation, the feed screw 2, the feed star wheel 3, the rotary table 5 and the discharge star wheel 6 are driven in synchronism.

Figure 1:
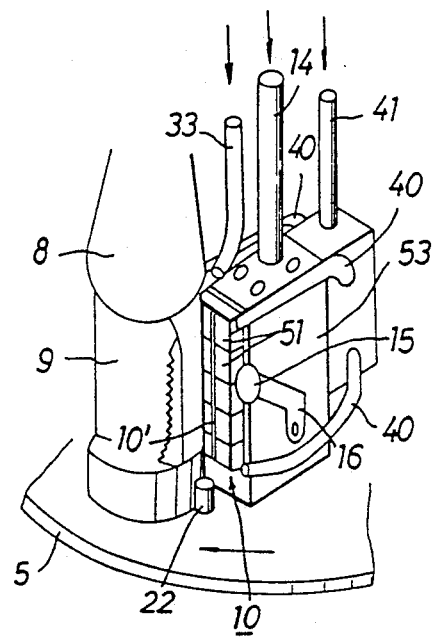
FIG. 1 is a fragmentary perspective view.
Figure 6:
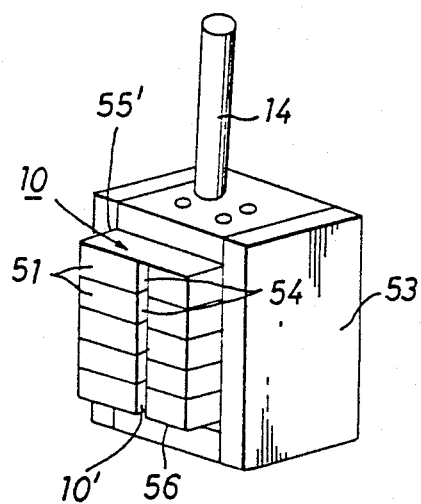
FIG. 6 is a perspective view showing the appearance of the hot air jet nozzle assembly.

A jet of hot air forced out from a slit is applied to the side portion of the bottle 8 as fixedly placed on the rotary table 5, whereby a label 9 of heat-shrinkable tube covering the bottle 8 is cut on melting. As seen in FIGS. 1 and 6, a hot air jet nozzle 10 having an orifice 10' in the form of a vertically elongated slit of a very small width is disposed inwardly of each of the positions where bottles 8 are placed on the rotary table 5, with an adjustable very small distance provided between the nozzle ejection end and the surface of the bottle 8.

Figure 7:
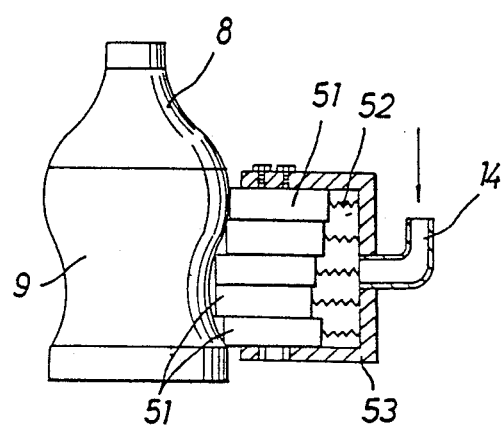
FIG. 7 is a side elevation in vertical section showing the jet nozzle assembly of FIG. 6 as it is used for a bottle of special shape.

Each hot air jet nozzle 10 of the present invention comprises a plurality of blocks 51. The nozzle 10 of the present embodiment comprises five blocks. The blocks 51 are individually movable toward or away from the bottle surface (label surface), whereby the distance between the ejection end of the nozzle and the bottle surface (label surface) is adjusted as seen in FIG. 7 and as will be described more specifically later.

With reference to FIG. 4, a hot air producing unit 11 at the top always supplies hot air to the jet nozzle 10 via rotary joint 12, a hot air branch pipe 13 and a pipe 14. An L-shaped label holding arm 16 carrying a roller 15 at its forward end is movably supported by a pivot 17 on each of opposite sides of the nozzle 10. The roller 15 is usually lightly bears on a side portion of the bottle 8 under gravity. The label holding arm 16 has a projecting plate 18. A pushing-up rod 19 is movable upward and downward by a pushing-up cam 20 which is provided concentrically with the main shaft 4. The upper end of the rod 19 is positioned under the projecting plate 18. The rod may alternatively be made movable upward pneumatically, i.e. by the force of an air jet, instead of using the pushing-up cam. Only in section A of FIG. 2, i.e. at the position of a label collecting duct 21, the cam 20 pushes up the pushing-up rods 19, moving the rollers 15 on the holding arms 16 away from the label 9. In the other section, i.e. section C, the rollers 15 are lightly in contact with the label 9 on the bottle 8 at opposite sides of the jet nozzle 10 as seen in FIG. 4. Indicated at 22 is a bottle stopper provided on the rotary table 5 inwardly of the position of each bottle thereon, and at 23 a guide bar for guiding bottles 8 when they are transferred from the star wheel 3 to the rotary table 5.

A chucking head 24 is vertically movably fitted to the lower end of a lift rod 25 disposed above each bottle on the rotary table 5 coaxially with the bottle 8. The chucking head 24 is biased downward by a coiled compression spring 27 provided between the head and a flange 26. The lift rod 25 is movable upward and downward by an annular chucking cam 28 disposed around the main shaft 4 concentrically therewith. The rod 25 is in its lowered position in section B shown in FIG. 2, fixedly holding the mouth of the bottle 8 with its chucking head 24. The lift rod 25 is vertically movably inserted through and supported by each of cylinders 30 mounted on a disk 29 secured to the main shaft 4 and arranged along the disk other periphery. The lift rod 25 is restrained from rotating about its own axis by a guide roller 32 slidable on a grooved vertical guide member 31 mounted on the cylinder 30.

A first compressed air jet nozzle (hereinafter referred to as a "first nozzle") 33 is disposed above the hot air jet nozzle 10 positioned inwardly of the bottle 8 on the rotary table 5. The first nozzle 33 is connected by an air pipe 34 to a valve 35, to which compressed air is supplied at all times from the lower end of the main shaft 4 via a rotary joint 36, the main shaft 4 and a pipe 37. The first nozzle 33 may be provided in combination with an auxiliary nozzle 33' indicated in a broken line and disposed at the outer side of the bottle 8. For example, the nozzle 33' may extend from the pipe 34 as a branch. The valve 35 is fixedly mounted on a small disk 38 secured to the main shaft 4. When revolved with the main shaft 4, the valve 35 is operated by an annular cam 39 provided thereabove so as to discharge compressed air from the first nozzle 33 in section D shown in FIG. 2.

Four second compressed air jet nozzles (hereinafter referred to as "second nozzles") 40 are arranged at upper and lower positions at opposite sides of each bottle 8 on the rotary table 5 according to the present embodiment. These nozzles are connected to a valve 42 by an air pipe 41. As is the case with the first nozzle 33, compressed air is supplied at all times to the valve 42 via the pipe 37. Like the valve 35, the valve 42 is fixedly mounted on the small disk 38 secured to the main shaft 4. When revolved with the main shaft 4, the valve 42 is operated by an annular cam 43 disposed thereabove so as to discharge compressed air from the second nozzles 40 in section A in FIG. 2. The cams 39 and 43 are positioned on circles of different radii about the main shaft 4 and are operated as required to discharge air. The label collecting duct 21 collects the label 9 when it is thermally cut and blown off the bottle upon the release of the rollers 15 on the holding arms 16 from the label 9. The label collecting duct 21 may be a conveyor or the like travelling under the rotary table 15.

Next, the hot air jet nozzle 10 shown in FIGS. 6 and 7 will be described. FIG. 6 is a perspective view showing the appearance of the nozzle 10 as accommodated in a nozzle box 53. The front ejection side of the nozzle 10 has an orifice 10' in the form of a straight slit extending vertically in the center as in the conventional nozzle. The nozzle 10 of the present embodiment, however, comprises five rectangular blocks 51 placed one above another. The blocks 51 are individually independently movable toward or away from the bottle as desired for adjustment. Each block 51 is formed in the front ejection side thereof with an orifice 54 in the form of a vertical slit centrally thereof. When the blocks 51 are superposed as seen in FIG. 6, the orifices 54 are aligned continuously, forming the single straight slit-like orifice 10'. The blocks 51 superposed as aligned vertically with the ejection side of one block flush with that of another are used for bottles 8 of the shape shown in FIG. 1. However, for use with bottles 8 of the shape shown in FIG. 7, the respective blocks 51 are suitably moved forward or rearward so as to adjustingly make the distance between the surface of the bottle 8 (label surface) and the ejection side of the nozzle uniform to the greatest possible extent. If it is difficult to give a uniform clearance therebetween owing to the shape of the bottle, each block is adjusted suitably to give a clearance for easy cutting. The mode of adjustment of the blocks is not specifically limited. The hot air jet nozzle 10 comprising the blocks 51 thus set in position has in its ejection side a straight slit serving as its orifice 10'. According to the present embodiment, the upper side 55 of the uppermost block and the bottom side 56 of the lowermost block are closed so as not to permit hot air to escape therefrom. However, this is not a limited feature; the orifice 10' may be left open at the upper side 55 and the bottom side 56. In FIG. 7, the distance between the surface of the bottle 8 and the ejection side of each block 51 is not always uniform because the blocks 51 have a large thickness. (This mode of arrangement is of course included within the scope of the invention.) In such a case, the use of a larger number of thinner blocks 51 serves to make the distance more uniform. The thickness of the blocks, which is not limited specifically, is usually about 2 to about 10 mm. The plurality of blocks 51 are accommodated in the nozzle box 53, which comprises upper and lower walls, opposite side walls and a rear wall. Provided between each block 51 and the rear wall is a space, in which a compression spring 52 is disposed to adjustingly move the block 51 forward or rearward utilizing the force of the spring. After the adjustment, the block 51 is locked in position by a setting bolt (not shown) extending through one of the side walls. Other suitable means is alternatively usable for locking. The pipe 14 for supplying hot air is connected to the box 53 in communication with its interior space. The pipe is attached to the upper wall of the box in the case of FIGS. 1 and 6 or to the rear wall of the box in the case of FIG. 7. The position where the pipe 14 is connected to the box is not limited insofar as it communicates with the interior space.

Figure 14:
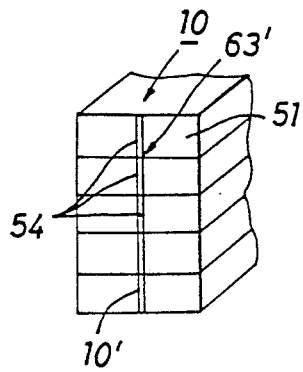

When the blocks 51 are superposed in layers, there may be a partition between the orifice 54 of one block and that of the block adjacent thereto as indicated at 63' in FIG. 14. In this case, the orifice 10' of the nozzle is not in the form of a continuous slit. The nozzle of this construction is of course also included in the scope of the invention.

The operation of the illustrated embodiment of the invention will be described next.

Bottles 8 each intimately covered with the label 9 to be collected are fed to the present apparatus as transported on the conveyor 1. The bottles 8 are aligned at a predetermined spacing by the feed screw 2 and transferred to specified positions on the rotary table 5 one after another by the feed star wheel 3. At the start position of section B in FIG. 2, the chucking head 24 descends to hold each bottle 8 on the rotary table 5. Positioned inwardly of the held bottle 8 is the hot air jet nozzle 10 in proximity thereto, while the first nozzle 33 is disposed above the nozzle 10 for discharging compressed air toward the upper end of the label 9 covering the bottle. The jet nozzle 10 and the first nozzle 33 revolve in synchronism with the bottle 8. Hot air is jetted out from the nozzle 10 at all times. The bottle 8 has, for example, the shape shown in FIG. 7. To thermally cut the label 9 covering the outer periphery of the trunk of the bottle 8 in intimate contact therewith, the blocks 51 of the jet nozzle 10 are moved forward or rearward within the box 53 for adjustment to position the ejection side of the nozzle at a specified distance from the surface of the bottle 8 (label surface) as seen in FIG. 7 before operation. Compressed air having a suitable pressure (e.g. 3 to 5 kg/cm$^2$) is discharged from the first nozzle 33 in section D of FIG. 2. The compressed air acts to form an air layer between the bottle surface and the label 9 to diminish the intimate contact therebetween. Accordingly, the label 9 is readily cut on melting when exposed to the hot blast air from the jet nozzle 10 in this state. Although the application of compressed air may be completed before cutting, it is desirable to cut the label with the hot air while applying the compressed air thereto to assure proper cutting free of trouble. It appears likely that the temperature of the portion to be thermally cut will be slightly lowered by the application of compressed air, but the desired cutting effect is nevertheless achieved. The compressed air and the hot air may be discharged at the same time or otherwise; one may be applied after the other suitably without particular limitation.

While the label 9 is efficiently cut by melting in this way, the rollers 15 on the forward ends of the pair of label holding arms 16 are slightly pushed up by the trunk of the bottle 8 when the bottle is transferred from the star wheel 3 onto the rotary table 5 before cutting, so that the label 9 is held by the arms 16. The label is thus held in section C of FIG. 2. Consequently, the label 9, even when cut by melting, is retained by the arm rollers 15 at opposite sides of the cut portion without slipping off.

When the bottle 8 is subsequently brought into section A, the cam 20 raises the pushing-up rod 19, which in turn moves the rollers 15 on the arms 16 away from the label 9. At the same time, compressed air is discharged from the four second nozzles 40, whereupon the cut label 9 is blown off by the pressure of the air and collected into the duct 21. During operation, the second nozzles 40 also revolve with the bottle 8. The chucking head 24 is thereafter raised by the cam 28 at the terminal end of section B to release the bottle 8. The bottle 8 stripped of the label 9 is transferred by the discharge star wheel 6 onto the conveyor 7, which further transports the bottle to a specified location.

Figure 8:
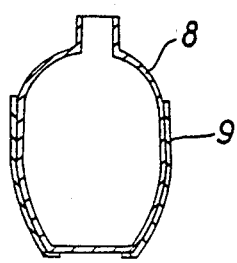
FIG. 8 is a sectional view showing a bottle intimately covered with a label extending to the outer periphery of its bottom.
Figure 9:
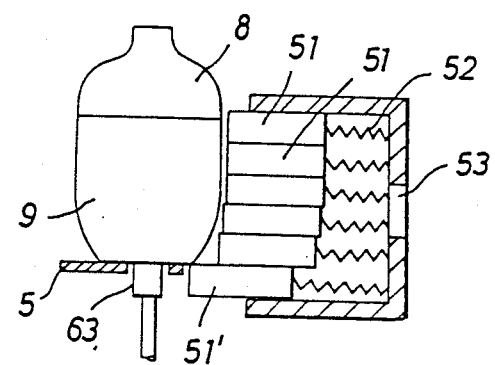
FIGS. 9 and 10 are side elevations in vertical section of a hot air jet nozzle assembly useful for the bottle of FIG. 8.
Figure 10:
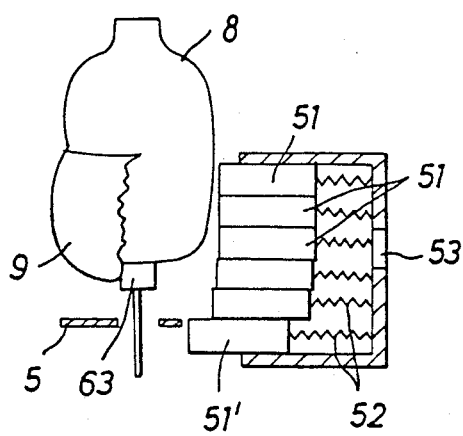

The hot air jet nozzle 10 of the above embodiment is adapted to remove the label 9 covering the trunk of the bottle 8 in intimate contact therewith. FIG. 8 shows a label 9 intimately covering a bottle 8 and extending to the outer periphery of its bottom. FIGS. 9 to 12 show a hot air jet nozzle 10 which is advantageously usable in this case. To thermally cut the label 9 extending to the outer periphery of the bottle 8, the lowermost block 51' needs to be in an advanced position to reach the bottom of the bottle 8 as illustrated. However, the block is not usable if having a forwardly open orifice 54 like the other blocks 51. The lowermost block 51' to be used therefore has the construction shown in FIG. 12. The block 51' has a slitlike orifice 54' which is open in its upper surface 57 and closed at its front end 65. The hot air jet nozzle 10 including this block 51' is shown in the perspective view of FIG. 11. When the block 51' of the above special construction is used, the rotary table 5 is formed with a cutout 67 at the portion thereof on which the bottom of the bottle 8 thereon is to rest, and the lowermost block 51' is positioned in the cutout. Like the other blocks 51, the block 51' is movable forward or rearward with a compression spring 52 attached thereto for adjustment. When the block 51' is in its most advanced position, the front side of the blocks 51 is positioned immediately thereabove. However, the lowermost block 51' need not always be adjustable as illustrated but can be fixedly positioned. The block 51' need not always be accommodated in the box 53.

Figure 12:
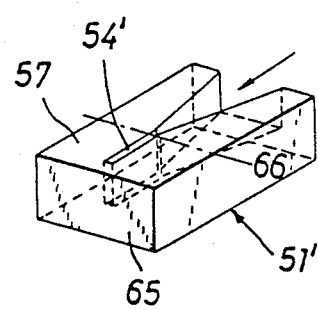
FIG. 12 is a perspective view showing the appearance of the lowermost block shown in FIGS. 9 to 11.

The embodiment described above with reference to FIGS. 9 to 11 incorporates the block 51' shown in FIG. 12, but the block 51' can be replaced by a branch pipe (not shown) extending from the pipe 14 and communicating with a slitlike orifice which is formed directly in the rotary table 5, such that hot air is discharged directly from the orifice to thermally cut the label portion over the outer periphery of the bottom of the bottle 8. Some other suitable means is also usable.

Figure 11:
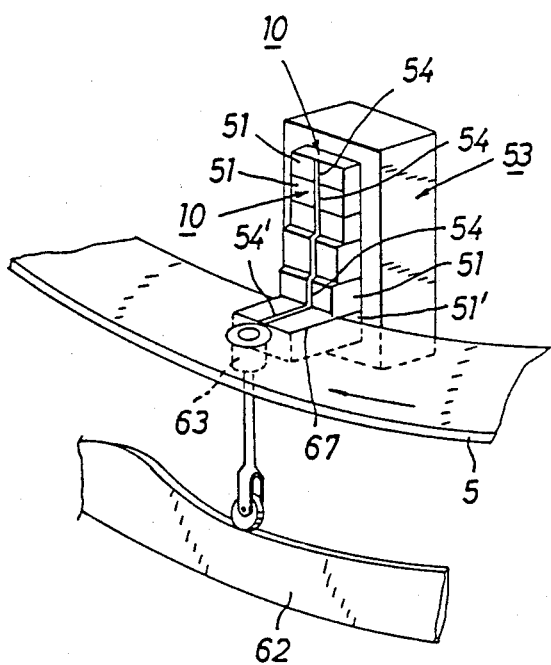
FIG. 11 is a perspective view showing the appearance of the assembly of FIG. 9 with the bottle removed.

Preferably, the embodiment of FIGS. 9 to 12 is so adapted as to blow off the cut label 9 as by compressed air for removal after lifting the bottom of the bottle 8. Preferably, the bottom of the bottle 8 is lifted, for example, by a pin 63 which is raised by a lift cam 62 as shown in FIG. 11. When this mechanism is employed, the chucking head 24 shown in FIG. 4 is made movable upward and downward simultaneously with the pin 63.

While the preferred embodiments of the invention have been described above, the invention is of course not limited by these embodiments. For example, when the blocks constituting the hot air jet nozzle are arranged side by side laterally for jetting out hot air from a horizontal slit, the labels on bottles transported laterally can be cut by melting.

The bottles to be handled by the method and apparatus of the invention include glass bottles, ceramic or porcelain bottles, metal bottles, etc. The heat-shrinkable label 9 is one prepared from a heat-shrinkable film in the form of a tube. The tube may be formed by the center sealing method, i.e. by folding one side of a flat film over the other side thereof and sealing the lapping side edges together. A tubular film may be used as it is. Thus, the tube to be used is not limited specifically. The label may be printed usually on the front surface and/or the rear surface of the label although where to print is not limited specifically. Examples of useful materials for the film are polyvinyl chloride, polyethylene, polypropylene, other polyolefin, polyester and other known materials. The film can of course be an expanded one, or a laminate of expanded film and non-expanded film.

Although it is desirable that the first nozzle 33 for discharging compressed air to diminish the intimate contact of the label 9 with the bottle be disposed immediately above the hot air jet nozzle 10, the position of the nozzle may be above or below the nozzle 10 insofar as it is capable of forcing air in between the label 9 and the bottle 8. It is also desirable that the compressed air for removing the cut label 9 be discharged from the second nozzles 40 other than the first nozzle 33 against the side of the bottle as already stated, but the portion to which the air is to be applied is not limited to the side. The thermally cut label 9 is of course removable by applying air from above in section A using the first nozzle 33. In this case, the second nozzles 40 may be provided when required. Further the auxiliary nozzle 33' will of course be useful to achieve an improved removal efficiency. The auxiliary nozzle 33' will be directed toward an end portion of the label 9 so that air will be applied thereto from above and/or below. It is also likely that the auxiliary nozzle 33' only will be used for removing the label.

To assure a proper operation and further to attain a higher efficiency by shortening the time required for cutting the label with the hot air discharged from the hot air jet nozzle 10, the slit width of the nozzle 10 should be 0.1 to 2.0 mm, preferably 0.2 to 1.0 mm, the hot air should be discharged at a temperature of at least 150° C., preferably 150° to 300° C., at a velocity of at least 30 m/sec, preferably 50 to 250 m/sec, and the distance between the ejection end of the nozzle and the labeled bottle should be up to 15 mm, preferably 0.5 to 5 mm. Aside from special labels, usual labels can then be completely cut by melting generally within 2.5 seconds, preferably within 1.5 seconds. This serves to improve the efficiency of the automatic line. Although the operation conducted under conditions outside the above numerical ranges of apparently included within the scope of the invention, difficulty is then often encountered in incorporating the present apparatus into an automatic line.

Figure 13:
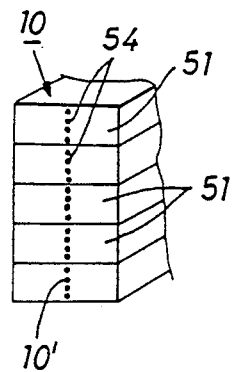
FIGS. 13 and 14 are perspective views showing the appearance of other embodiments of jet nozzles.

Although the nozzles 10 of the foregoing embodiments have a slitlike orifice, the nozzle may have a series of small circular or elliptical orifices as seen in FIG. 13. The arrangement of such small orifices can generally be regarded as slitlike, so that the term "slitlike" or "in the form of a slit" as used herein includes a series or arrangement of small orifices.

According to the present invention, a hot air jet nozzle comprising a plurality of blocks which are individually movable forward or rearward is adapted to discharge hot air from a slitlike orifice, so that the nozzle is universally usable for bottles of various shapes which are covered with a label of heat-shrinkable tube in intimate contact with the outer periphery of the bottle. Unlike the conventional one, the jet nozzle need not be changed every time the shape of bottles to be handled is altered, but is usable immediately after simple adjustment. This ensures great advantages in achieving an improved operation efficiency and in cost reduction.

INDUSTRIAL APPLICATION

In brief, the method and apparatus of the invention for automatically cutting heat-shrinkable labels by melting are especially advantageous for handling bottles of different shapes and are suitable for thermally cutting the labels around bottles.

We claim:

1. A method of cutting a label from a heat-shrinkable tube covering the outer periphery of a bottle in intimate contact therewith by melting the label by the application of hot air thereto, wherein a plurality of blocks are superposed along the axial direction of the bottle and in opposition to the label and are each individually adjustingly moved toward or away from the label to position a label-facing side of each block at a predetermined distance from the surface of the label, and wherein the hot air is discharged from the label-facing side of each block to cut the label over the entire length thereof in the axial direction.

2. A method of cutting a label as defined in claim 1, wherein compressed air is forced in between the label and the bottle from an axial end of the label at the cutting position to diminish the intimate contact of the label with the bottle, when the label is cut.

3. A method of cutting a label as defined in claim 1 wherein the hot air is discharged from a slitlike orifice formed in the label-facing side of each block and extending in the axial direction of the bottle.

4. A method of cutting a label as defined in claim 1, wherein the hot air is discharged from an orifice comprising a plurality of small circular or elliptical holes formed in the label-facing side of each block and arranged in the axial direction of the bottle.

5. A method of cutting a label as defined in claim 1, wherein the hot air is discharged at a temperature of at least 150° C. at a velocity of 30 m/sec to 250 m/sec, the distance between the label-facing side of each block and the label surface being 0.5 mm to 15 mm.

6. A method of cutting a label as defined in claim 3, wherein the slit-like orifice has a width of 0.1 mm to 2.0 mm.

7. An apparatus for cutting a label from a heat-shrinkable tube covering the outer periphery of a bottle in intimate contact therewith by melting, comprising a plurality of blocks positionable in opposed relation to a surface of the label and superposed along the axial direction of the bottle, each of the blocks being movable toward or away from the label to position a label-facing side of the block at an adjustable distance from the surface of the label, each block being formed in its label-facing side with an orifice for discharging hot air against the label surface.

8. An apparatus for cutting a label as defined in claim 7, wherein the blocks are accommodated in a nozzle box and adjustingly movable toward or away from the label.

9. An apparatus for cutting a label as defined in claim 7, wherein each orifice is in the form of a slit extending along the axial direction of the bottle.

10. An apparatus for cutting a label as defined in claim 7, wherein the orifice comprises small circular or elliptical holes arranged in the axial direction of the bottle.

11. An apparatus for cutting a label as defined in claim 8, wherein each of the blocks is biased toward the bottle by a spring provided within the nozzle box and is fixed to the nozzle box against the force of the spring by fastening means provided on the nozzle box.

12. An apparatus for cutting a label as defined in claim 8 characterized in that the nozzle box has inside, wherein a hot air holding space, to which hot air is supplied, is provided within the nozzle box in communication with the orifice.

13. An apparatus for cutting a label as defined in claim 7, wherein a nozzle for forcing compressed air in between the label and the bottle is provided above and/or below the blocks.

14. An apparatus for cutting a label as defined in claim 9, wherein the slit has a width of 0.1 mm to 2.0 mm.

* * * * *